United States Patent
Stroud

[11] Patent Number: 5,862,775
[45] Date of Patent: Jan. 26, 1999

[54] SEWER BACKUP INDICATOR

[76] Inventor: John B. Stroud, Route 2, Box 68-A, Walterboro, S.C. 29488

[21] Appl. No.: 685,496

[22] Filed: Jul. 24, 1996

[51] Int. Cl.[6] ..................................................... G01F 23/30
[52] U.S. Cl. ............................... 116/228; 73/319; 73/322
[58] Field of Search .................................. 116/228, 229; 73/309, 310, 319, 322, 322.5

[56] References Cited

U.S. PATENT DOCUMENTS

| | | |
|---|---|---|
| 14,959 | 5/1856 | Hoyt ........................................ 73/322.5 |
| 688,607 | 12/1901 | Dixon ........................................ 73/322 |
| 1,489,957 | 4/1924 | Morton ...................................... 73/322 |
| 2,588,667 | 3/1952 | Stutzman ................................ 73/322.5 |
| 2,738,675 | 3/1956 | Blair ......................................... 73/322 |
| 2,802,362 | 8/1957 | Lyon ...................................... 116/228 |
| 3,166,041 | 1/1965 | Caggainello . |
| 3,407,660 | 10/1968 | Nusbaum ................................. 73/322 |
| 3,926,143 | 12/1975 | Hothan . |
| 3,954,612 | 5/1976 | Wilkerson . |
| 3,960,107 | 6/1976 | McCloskey . |
| 4,119,056 | 10/1978 | Cahill . |
| 4,171,593 | 10/1979 | Bigglestone . |
| 4,249,598 | 2/1981 | Greer . |
| 4,373,381 | 2/1983 | Kulp et al. . |
| 4,402,209 | 9/1983 | Di Domenico . |
| 4,625,549 | 12/1986 | Mahoney . |
| 4,879,545 | 11/1989 | Aguilar . |
| 4,961,068 | 10/1990 | Hendricksen . |
| 4,962,370 | 10/1990 | Borriello .................................. 73/319 |
| 4,973,950 | 11/1990 | Tourtillott . |
| 4,997,312 | 3/1991 | Regan . |
| 5,195,841 | 3/1993 | Mullins . |
| 5,303,931 | 4/1994 | Brown . |
| 5,687,761 | 11/1997 | Langes ................................... 73/319 |

*Primary Examiner*—Diego F. F. Gutierrez
*Assistant Examiner*—Andrew Hirshfeld
*Attorney, Agent, or Firm*—Michael A Mann

[57] ABSTRACT

The present invention is a sewer back-up indicator that is positioned within the hole in the cover of the manhole. The indicator includes a bushing and a rod having a valve at one end and an inflatable balloon at the other. The valve is adapted to receive a gas source which supplies the gas down the length of the rod into the balloon, thus inflating the balloon. When the balloon is in the deflated state, the device can be inserted into position within the hole in the manhole cover and subsequently removed from this position without lifting or removing the cover from the manhole. Connected to the other end of the valve is a flexible member that carries a flag having a legend thereon. When the device is in its up position, the flag and flexible member indicate that fluid within the manhole has risen, thus signaling a potential back-up. In addition, the legend on the flag will provide emergency information, so that a passerby can notify the appropriate personnel that a sewer back-up has occurred before the fluid within the sewer has escaped its confines.

16 Claims, 3 Drawing Sheets

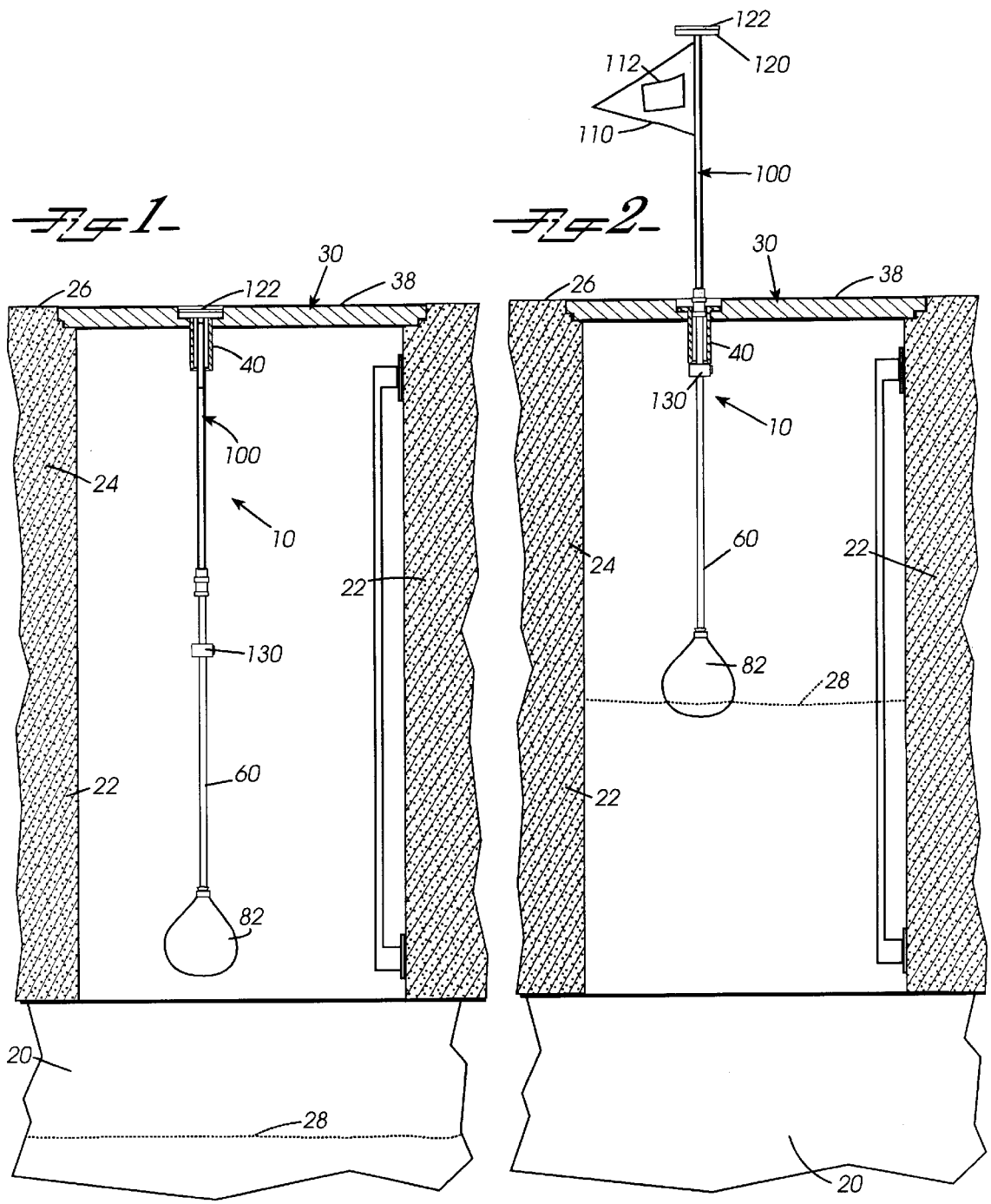

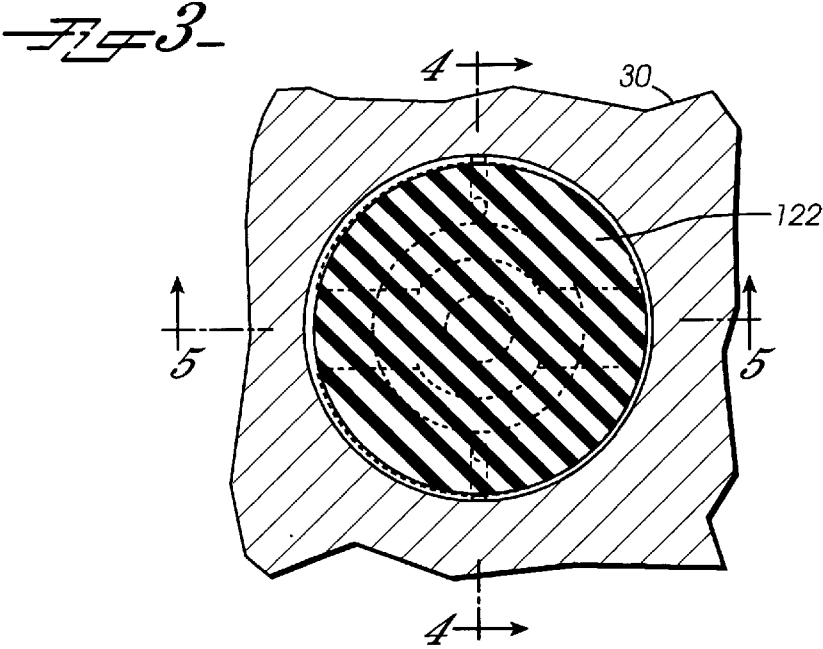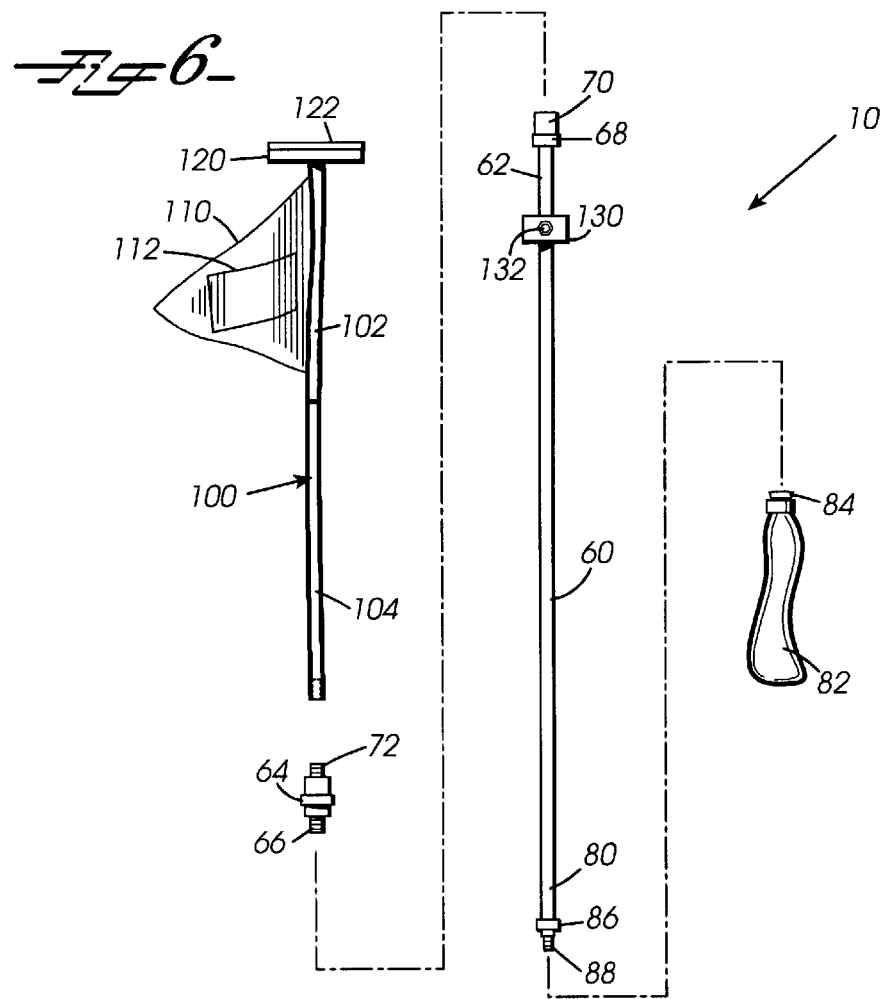

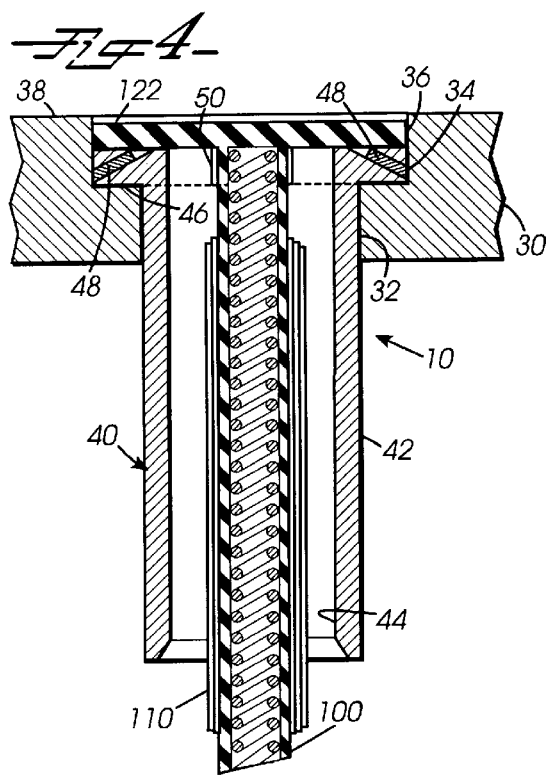
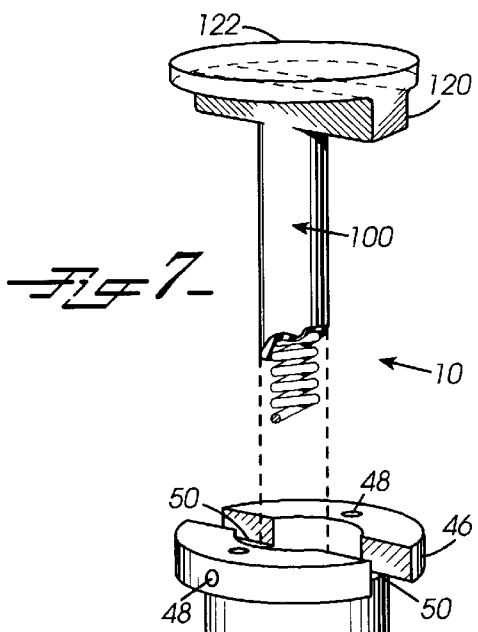
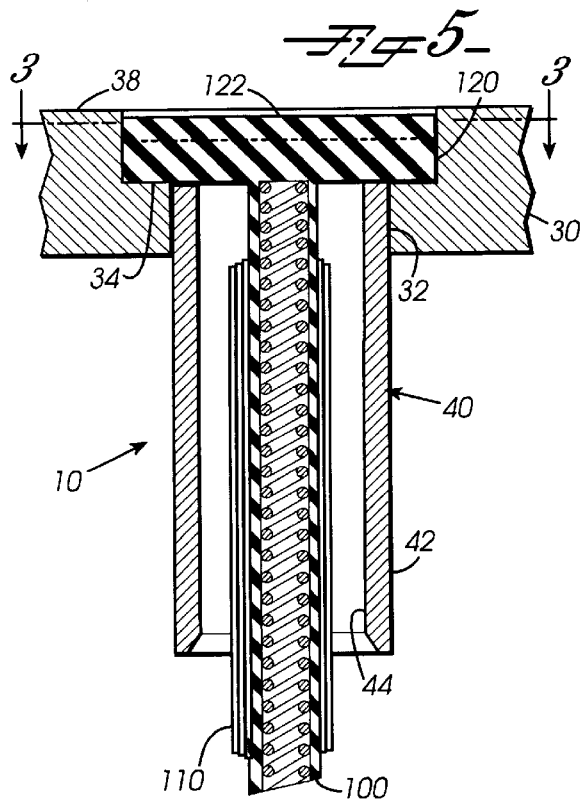
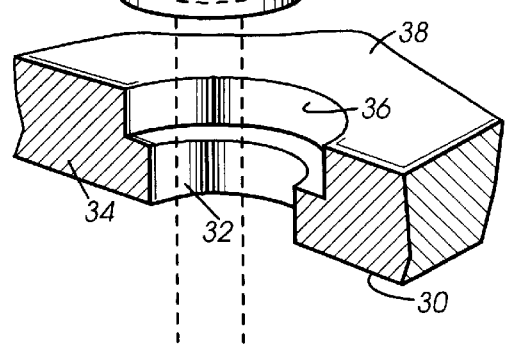

5,862,775

SEWER BACKUP INDICATOR

BACKGROUND OF THE INVENTION

1. Field of the Invention

The present invention relates to a sewer backup indicator. In particular, the present invention relates to a float indicator mounted on an elongated rod, that is positioned within a finger hole of a manhole cover to indicate a rising water level in the sewer and, thus, that the sewer is backing up.

2. Discussion of Background

Sewage systems collect waste water and treat it before returning it to the environment. These systems consist of a network of underground conduits or sewers that carry the sewage through the treatment process to the point of disposal. While the sewers are typically buried, there are a plurality of manholes that provide access into the sewer system.

The wastes within the sewer are rarely pumped, but flow instead because the sewers are constructed at an angle so that the water and wastes will flow downward due to gravity. The flow within the sewers can be restricted at times due to obstructions. These obstructions can be caused by wastes clogging within the sewer or by external factors, including roots breaking through the sewer wall and internal collapses of the sewer wall.

Any obstruction in the sewer will likely cause the water and waste stream to begin to back-up. As it backs up up-stream from the obstruction, the water will begin to rise in the sewers and the manholes. Typically, there is no way to tell if the sewer is backing up until the water and wastes begin to flow out of the manhole closest to the obstruction, while the manhole just down stream from the obstruction shows no change. When waste escapes from the manhole and sewer system, there are many complications that must be dealt with. First, the waste is capable of transmitting a wide variety of diseases and must ultimately be cleaned up. Second, due to environmental regulations on the local, state, and federal level, the leakage of the sewage must be reported and a large amount of paper work documenting the leakage must be filed.

Therefore, there is a need for a system that will alert the appropriate personnel when an obstruction or blockage has occurred before there is leakage, so that the obstruction can be removed and the proper flow of the sewer restored. In addition, there is a need for a system that not only indicates the presence of an obstruction that causes the sewer to back up, but also a system that helps locate the obstruction.

SUMMARY OF THE INVENTION

According to its major aspects and broadly stated the present invention is a device for indicating if a sewer is backing up. The sewer is typically located in the ground and is connected to the surface by a manhole. In addition, the sewer has fluid and wastes that flows therein and the manhole has a cover with a hole extending therethrough. The present invention is adapted to slidably fit within the hole of the manhole cover and to be responsive to a fluid level rise within the sewer and manhole. In other words, when the fluid level rises within the manhole, the device moves from a down position to an up position, thus indicating the sewer is backing up.

In the preferred embodiment of the present invention, the device comprises a bushing having a channel extending therethrough where the bushing is designed to fit within the hole in the cover. Furthermore, the bushing has a collar that is designed to fit within a counterbore in the hole in the cover. In addition, the collar has two set-screws that secure the bushing within the hole.

The device also has a hollow rod that sidably fits through the channel and has a first end and a second end. Removably attached to the second end of the rod is a balloon and to the first end is a valve. The balloon is also designed so that it is insertable through the channel of the bushing or hole in the cover when the balloon is in its deflated state. The valve is adapted to receive a gas source, so that when the gas source is introduced to the valve, the gas travels through the interior of the rod and inflates the balloon. Furthermore, there is an adjustable sleeve that is mounted on the rod which has a diameter greater than the channel in the bushing, but has a diameter smaller than the hole in the cover. The sleeve limits the amount of movement of the rod within the bushing.

Indicating means is attached to the valve at the first end of the rod which indicates when the sewer is backing up. This indicating means comprises a flexible member that extends from the valve and ends in a T-shaped handle. The flexible member in the preferred embodiment is a rubber coated spring that supports a reflective flag. The flag serves as a visual indicator that can be seen from a distance, but also carries a legend which provides emergency information for a passerby to notify authorities of the sewer backing up. In the preferred embodiment, the flexible member is a rubber coated spring having a top portion and a bottom portion. The top portion is more flexible than the bottom portion, thus providing less resistance if it were hit by an object.

In the preferred embodiment, the T-shaped handle is received within a slot in the bushing. In addition, the handle has a cap attached thereto, that is dimensioned to cover the hole in the cover and the channel in the bushing when the device is in the down position. Furthermore, when the device is in the down position, the handle and the cap are recessed within the counterbore and the hole so that none of the device extends above the top surface of the cover.

A major feature of the present invention is the ability of the present invention to be installed in and removed from the cover of a manhole without removing the cover. To install the present invention, the rod is inserted through the bushing and the balloon is attached. The bushing is then positioned within the hole and the rod and balloon are passed through the hole in the cover. The balloon is then inflated by flowing a gas through the valve and rod. Once the balloon is inflated, the indicating means is attached to the valve and the device is positioned in the down position.

Another important feature of the present invention is that the device is positioned below the top surface of the cover. Therefore, there is nothing that would provide an obstacle to a car or other vehicles that may be traveling over the cover. This is especially important when the manholes are located within the streets. The flexible spring that supports that flag is also important in this aspect because, if the device were in the up position and hit by a vehicle, the spring would flex and absorb the hit as opposed to breaking, thus requiring the complete device to be replaced.

Still another feature of the present invention is the relatively long dimensions of the device. Sometimes the manholes that provide the entrance to the sewer are located in areas that are not readily visible. When the sewer has begun to back up, thus causing the device to move from its down position to its up position, the rod and indicating means are in a relatively visible position, thus greatly increasing the chances of finding the backing up sewer before it begins to overflow.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a cross-sectional view of a sewer back-up indicator positioned within the cover to a manhole in the down position, according to a preferred embodiment of the present invention;

FIG. 2 is a cross-sectional view of a sewer back-up indicator positioned within the cover of a manhole in the up position, according to a preferred embodiment of the present invention;

FIG. 3 is a cross-sectional view of a sewer back-up indicator taken along line 3—3 of FIG. 5, according to a preferred embodiment of the present invention;

FIG. 4 is a cross-sectional view of a sewer back-up indicator taken along line 4—4 of FIG. 3, according to a preferred embodiment of the present invention;

FIG. 5 is a cross-sectional view of a sewer back-up indicator taken along line 5–5 of FIG. 3, according to a preferred embodiment of the present invention;

FIG. 6 is an exploded view of a sewer back-up indicator according to a preferred embodiment of the present invention; and FIG. 7 is an exploded perspective view of a sewer back-up indicator according to a preferred embodiment of the present invention.

DETAILED DESCRIPTION OF A PREFERRED EMBODIMENT

Referring now to the Figures, the present invention is a device 10 for indicating when a sewer 20 is backed-up. Sewer 20 is of the type that is typically positioned below ground 22 and has a manhole 24 that connects sewer 20 to the surface 26. Manhole 24 is also typically circular in shape having a cover 30 that closes manhole 24. In addition, cover 30 has a hole 32 that extends therethrough, which facilitates removal of cover 30.

Device 10, as shown in FIGS. 1 and 2 has a down position and an up position, respectively. Device 10 is responsive to a change in level of fluid 28 or waste water that is present within sewer 20 and manhole 24. Consequently, as the level of fluid 28 changes device 10 moves between the down position and the up position.

The device 10 comprises a bushing 40 and an elongated rod 60. Bushing 40, as shown in detail in FIGS. 3–5 and 7, is a cylindrical tube 42 having a channel 44 extending therethrough. Bushing 40 also has a collar 46 positioned on one end. In a preferred embodiment, hole 32 in cover 30 has a counterbore 34 that extends part way into cover 30. Positioned within collar 46 of bushing 40 and disposed at opposite hemispheres are a pair of set screws 48. Set screws 48 are positioned at an angle, so that as set screws 48 are tightened, a force is exerted against the walls 36 of counterbore 34. This force helps secure bushing 40 within counterbore 34 and hole 32, thus preventing bushing 40 from being inadvertently removed after it has been secured in place. In addition, collar 46 of bushing 40 has a slot 50 formed therein. Slot 50 is offset from set screws 48 by 90°, and its function will be described in detail below.

In the preferred embodiment, hole 32 within cover 30 has a diameter of just over 1⅛" and a counterbore 34 of just over 1¾" in diameter. Bushing 40 is approximately 1⅛" in diameter with collar 46 having an approximate diameter of 1¾". Collar 46 has a thickness of about ¼" and bushing 40 extends approximately 6", thus extending well through cover 30. In addition, channel 44 extending through bushing 40 has a diameter of about ⅝".

Rod 60, as shown in detail in FIG. 6, has a first end 62 and a second end 80 and is dimensioned to slidably fit through channel 44 of bushing 40. Attached to second end 80 is a balloon 82 that has a deflated and an inflated state. Balloon 82 has an inlet 84, which in the preferred embodiment is a ⅛" female pipe thread 70. Inlet 84 is connected to second end 80 of rod 60 by a ⅛" male pipe thread 88 and ⅛" compression ring 86 which is part of second end 80.

Connected to first end 62 of rod 60 is a valve 64, and in the preferred embodiment a ⅛" schrader valve. Valve 64 is connected to first end 62 by a ⅛" male pipe thread 66 carried by valve 64 and a ⅛" female pipe thread 70 and ¼" compression 68 carried by first end 62. Valve 64 is adapted to receive a gas source and transmit the gas from valve 64 through the interior of rod 60 into balloon 82. When this gas source is supplied, balloon 82 inflates from its deflated state to its inflated state, as will be described in more detail below.

Attached to the opposing ⅛" male pipe thread 66 of valve 64 is flexible member 100 having a first section 102 and a second section 104. First section 102 of flexible member 100 is more flexible than second section 104 which is connected to valve 64. Flexible member 100 in a preferred embodiment is a rubber coated spring having reflective coating on second section 104. In addition, a reflective flag 10 is carried by second section 104 that has a legend 112 printed thereon. Legend 112 displays emergency information for a passerby to notify that sewer 20 is backed-up.

In a preferred embodiment, rod 60 is a ¼" diameter thin walled piece of stainless steel tubing, while first section 102 of flexible member 100 is a 1" length of ⅜" outside diameter spring. Second section 104 of flexible member 100 is an 8" length of ⅜" outside diameter spring being relatively more flexible than first section 102. Furthermore, flag 110 attached to second section 104 is preferably a 6" by 6" plastic flag.

Attached to the end of first section 102 is a T-shaped handle 120, and in the preferred embodiment, has a length of about 1½" and a thickness of about ¼". Handle 120 is dimensioned so that when device 10 is in the down position, as shown in FIGS. 1 and 3–5, handle 120 is recessed within slot 50 of collar 46 and positioned below the top surface 38 of cover 30 (See FIGS. 1 and 2). Positioned on the top of handle 120 is a cap 122 having a generally, circular shape. When device 10 is in the down position, cap 122 is designed to cover channel 44 in bushing 40 and collar 46. Cap 122 in this position, prevents debris, such as dirt, sand, or other foreign materials from entering sewer 20 or bushing 40.

There is also an adjustable ring 130 positioned between first end 62 and second end 80 of rod 60. Adjustable ring 130 is a sleeve having a set screw 132 positioned therein. Set screw 132 is designed to securely position adjustable ring 130 at any desired position on rod 60 between first end 62 and second end 80. As device 10 moves from its down position to its up position in response to the rising level of fluid 28 in sewer 20 and manhole 24, adjustable ring 130 will limit the extent of movement of device 10. Therefore, adjustable ring 130 will prevent device 10 from becoming dislodged from hole 32 and counterbore 34 by the upward movement of balloon 82. In the preferred embodiment, adjustable ring 130 has a diameter smaller than hole 32 in cover 30, but larger than the diameter of channel 44 in bushing 40.

Device 10 may be installed within cover 30 without having to remove or lift cover 30. The installation steps are as follows:

1) Inserting second end 80 of rod 60 through channel 44 of bushing 40.

2) Inserting adjustable ring 130 over second end 80 of rod 60.

3) Attaching balloon 82 to second end 80 of rod 60.

4) Attaching valve 64 to first end 62 of rod 60.

5) Inserting balloon 82, rod 60, adjustment ring 130, and bushing 40 through hole 32 in cover 30, so that collar 46 of bushing 40 sits within counterbore 34 of hole 32.

6) Tightening set screws 48 of collar 46, so that bushing 40 is secured within hole 32 and counterbore 34.

7) Inflating balloon 82, by supplying a gas to valve 64.

8) Attaching flexible member 100 to valve 64.

9) Positioning handle 120 and cap 122 within counterbore 34 and hole 32 so that device 10 is recessed within cover 30.

It will be recognized that many modifications to the above installation procedures may be used without departing from the spirit and scope of the present invention. For instance, balloon 82 may be made integral with second end 80 of rod 60. In this case balloon 82 would be inserted through channel 44 of bushing 40 before it was inserted through hole 32 of cover 30. In addition, with this configuration, adjustable ring 130 would be fitted over balloon 82 before balloon 82 and rod 60 are inserted into channel 44.

Once device 10 has been installed by the above steps or a variation thereof, balloon 82 is responsive to a rising level of fluid 28 within manhole 24 and sewer 20. In other words, as specifically, shown in FIGS. 1 and 2, fluid 28 causes balloon 82 and thus, rod 60 and flexible member 100 to rise through channel 44. Therefore, as fluid 28 rises, raising balloon 82, flag 110 and flexible member 100, device 10 provide a visible indication that sewer 20 is backed-up which can be seen from a distance.

In addition, the use of devices 10 in a series of manholes 24 on a sewer 20 will help provide an indication where the blockage is in sewer 20 that is causing fluid 28 to rise. In other words, if there is a blockage in sewer 20 causing fluid 28 to rise, devices 10 upstream from the blockage will begin to rise, and the devices 10 downstream from the blockage will not rise, thus providing an indication of which section of sewer 20 the blockage is located.

The above dimensions disclosed with respect to the present invention are intended to be merely illustrative of a preferred embodiment and its relative proportional relationships, and thus should not be construed as limiting the present invention, which is defined by the appended claims.

In addition, it will be apparent to those skilled in the art that many changes and substitutions can be made to the preferred embodiment herein described without departing from the spirit and scope of the present invention as defined by the appended claims.

For instance it may be possible that balloon 82 is replaced by an elongated chamber, being vacated or possibly filled with a buoyant material. This chamber would be dimensioned to fit through hole 32 in cover 30 and would also be responsive to a rising level of fluid 28 in sewer 20.

What is claimed is:

1. A device for indicating if a sewer is backing up, said sewer being underground and connected to the surface by a manhole, said manhole having a cover with a hole therethrough, said device comprising:

a rod dimensioned to slidably fit through said hole between a down position and an up position, said rod having a first end and a second end;

means carried by said first end of said rod for indicating said rod has slid to said up position;

floatation means carried by said second end of said rod for moving said rod from said down position to said up position, said floatation means dimensioned to fit through said hole in said cover; and means carried by said first end of said rod and adapted to receive a gas source for inflating said floatation means with gas, wherein said inflating means is a valve, said valve adapted to receive said gas source in order to inflate said floatation means, and wherein said indicating means is attached to said valve and further comprises a flexible spring having a flag with a legend thereon.

2. The device as recited in claim 1, wherein said floatation means further comprises a balloon carried by said second end of said rod, said balloon having an inflated and a deflated state, so that when said balloon is in said deflated state, said balloon can pass through said hole in said cover.

3. The device as recited in claim 1, wherein said rod has an interior passage extending from said first end to said second end, so that said gas can be supplied to said first end of said rod to inflate said floatation means at said second end of said rod.

4. A device for indicating if a sewer is backing up, said sewer having a manhole with a cover, said cover having a hole therethrough, said device comprising:

a bushing adapted to fit within said hole, said bushing having a channel formed therein;

a rod dimensioned to slidably fit through said channel, said rod having a first end and a second end;

floatation means carried by said second end of said rod, said floatation means dimensioned to pass through said hole in said cover;

a flexible member carried by said inflating means; and a flag carried by said flexible member, said flag having a legend thereon for providing emergency information; and means carried by said first end of said rod and adapted to receive a gas source for inflating said floatation means.

5. The device as recited in claim 4, wherein said hole in said cover has a counterbore, and wherein said bushing has a collar that fits within said counterbore.

6. The device as recited in claim 4, further comprising a handle carried by said first end of said rod, said handle having a cap dimensioned to cover said channel in said bushing and said hole in said cover.

7. The device as recited in claim 4, further comprising means adjustably carried by said rod for limiting the movement of said rod within said channel of said bushing.

8. The device as recited in claim 4, wherein said cover has a top surface and said device has a down position and an up position, so that when said device is in said down position, said device is positioned below said top surface of said cover.

9. The device as recited in claim 4, wherein said bushing further comprises means for securing said bushing to said cover.

10. A device for indicating if a sewer is backing up, said sewer having a manhole with a cover, said cover having a hole therethrough, said hole also having a counterbore, said device comprising:

a bushing adapted to fit within said hole, said bushing having a channel formed therein, said bushing also having a collar dimensioned to fit within said counterbore of said hole;

a hollow rod adapted to slidably fit within said channel, said rod having a first end and a second end;

a balloon carried by said second end of said rod, said balloon having an inflated state and a deflated state, so that when said balloon is in said deflated state said balloon can pass through said hole in said cover;

means carried by said first end of said rod for indicating when said sewer is backed-up, and means carried by said first end of said rod and adapted to receive a gas source for inflating said balloon with gas, wherein said collar of said bushing has a slot formed therein and wherein said device has a down position and an up position, said device further comprising a T-shaped handle carried by said indicating means, said handle being recessed within said slot of said bushing when said device is in said down position.

11. The device as recited in claim 10, wherein said collar of said bushing has a pair of set screws to securely position said bushing within said hole of said cover.

12. The device as recited in claim 10, wherein said cover has a top surface and and wherein a cap is carried by said handle, said cap dimensioned to cover said channel of said bushing and said hole of said cover when said device is in said down position, said cap also being positioned below said top surface of said cover when said device is in said down position.

13. The device as recited in claim 10, wherein said inflating means is a valve, said valve adapted to receive said gas source, so that said gas flows through said hollow rod into said balloon and inflates said balloon.

14. The device as recited in claim 10, wherein said indicating means comprises:

a reflective-rubber coated spring carried by said first end of said rod;

a flag carried by said spring; and a legend on said flag providing emergency information.

15. The device as recited in claim 10, wherein said sewer has fluid flowing therein, said fluid, when said balloon is in said inflated state, causes said device to move from said down position to said up position when said fluid rises within said sewer.

16. The device as recited in claim 10, wherein said inflating means is a valve, said valve adapted to receive said gas source, so that said gas flows through said hollow rod into said balloon and inflates said balloon, and wherein said indicating means is carried by said valve and further comprises a flag having a legend thereon, said legend providing emergency information.

* * * * *